(12) United States Patent
Liu et al.

(10) Patent No.: US 12,523,426 B2
(45) Date of Patent: Jan. 13, 2026

(54) ENERGY-SAVING LOW-CARBON COMBUSTION SYSTEM FOR CERAMIC ROLLER KILN

(71) Applicant: GUANGDONG UNIVERSITY OF TECHNOLOGY, Guangzhou (CN)

(72) Inventors: Xiaozhou Liu, Guangzhou (CN); Wensheng Yang, Guangzhou (CN); Zebin Fu, Guangzhou (CN)

( * ) Notice: Subject to any disclaimer, the term of this patent is extended or adjusted under 35 U.S.C. 154(b) by 478 days.

(21) Appl. No.: 18/164,477

(22) Filed: Feb. 3, 2023

(65) Prior Publication Data

US 2024/0183615 A1 Jun. 6, 2024

(30) Foreign Application Priority Data

Dec. 2, 2022 (CN) .......................... 202211533635.9

(51) Int. Cl.
*F27D 1/00* (2006.01)
*F27B 9/30* (2006.01)
*F27D 3/00* (2006.01)

(52) U.S. Cl.
CPC .......... *F27D 1/0006* (2013.01); *F27B 9/3005* (2013.01); *F27D 2003/0042* (2013.01)

(58) Field of Classification Search
CPC ........ F27B 9/2407; F27B 9/3005; F27B 9/36; F27B 9/38; F27B 9/40; F27D 17/10; F27D 21/0035; F27D 19/00
See application file for complete search history.

(56) References Cited

U.S. PATENT DOCUMENTS

| 2005/0229748 | A1* | 10/2005 | Bleifuss | F27B 9/39 75/483 |
| 2006/0150775 | A1* | 7/2006 | Iwasaki | C22B 1/245 75/503 |
| 2012/0285295 | A1* | 11/2012 | Iwasaki | F27B 9/40 75/503 |
| 2024/0183615 | A1* | 6/2024 | Liu | F27B 9/3005 |

FOREIGN PATENT DOCUMENTS

| CN | 102721276 A | 10/2012 |
| CN | 210118739 U | 2/2020 |
| CN | 114166020 A | 3/2022 |

* cited by examiner

*Primary Examiner* — Ko-Wei Lin
(74) *Attorney, Agent, or Firm* — Central California IP Group, P.C.; Andrew D. Fortney

(57) ABSTRACT

An energy-saving low-carbon combustion system for a ceramic roller kiln comprises a kiln body, a roller conveyor belt, a circulating fan and a heat exchanger; a kiln chamber in the kiln body is divided into a low-temperature section, a medium-temperature section and a high-temperature section; a flue gas exhaust outlet of the low-temperature section is provided with the heat exchanger, an air pipe is connected with an air inlet of the heat exchanger, an air outlet of the heat exchanger is connected with a hot air pipe, and the hot air pipe is connected with burners in the medium-temperature section and the high-temperature section; the medium-temperature section is provided with a heat introduction outlet connected with the circulating fan that is connected with the kiln chamber in the low-temperature section; the roller conveyor belt penetrates through the kiln body; and the medium-temperature section is provided with a ceramic honeycomb body.

9 Claims, 2 Drawing Sheets

ENERGY-SAVING LOW-CARBON COMBUSTION SYSTEM FOR CERAMIC ROLLER KILN

CROSS REFERENCE TO RELATED APPLICATIONS

This application claims foreign priority of Chinese Patent Application No. 202211533635.9, filed on Dec. 2, 2022 in the China National Intellectual Property Administration, the disclosures of all of which are hereby incorporated by reference.

TECHNICAL FIELD

The present invention relates to the field of energy-saving and emission-reduction technologies for ceramic roller kilns, and particularly to an energy-saving low-carbon combustion system for a ceramic roller kiln.

BACKGROUND OF THE PRESENT INVENTION

At present, most ceramic roller kilns fueled with natural gas. The natural gas is widely used due to a high heat value and good environmental protection. However, the natural gas easily leads to a high operating cost and a high carbon dioxide emission of the ceramic roller kiln due to a high price and a high carbon content. In addition, a heat efficiency of the ceramic roller kiln cannot be displayed online, and a combustion condition of the ceramic roller kiln cannot be adjusted at any time according to the heat efficiency of the ceramic kiln. In addition, waste heat produced by the ceramic roller kiln has not been fully utilized, resulting in high energy consumption of the ceramic roller kiln.

Chinese patent application for invention with the publication number CN102721276A discloses an energy-saving reform system for a ceramic kiln, wherein a kiln chamber is sequentially divided into a preheating zone, a sintering zone and a cooling zone, and a plurality of burners are arranged on the sintering zone; the preheating zone is connected with a power generation device, and high-temperature air in the preheating zone is used for generating power; the gas exhausted by the power generation device is introduced into the preheating zone of the kiln chamber; and a plurality of retaining walls are alternately arranged in the kiln chamber of the preheating zone for prolonging an air walking process in the preheating zone. In the technical solution above, although high-temperature high-grade energy in the preheating zone may be fully utilized to achieve the purpose of effectively recycling a waste heat, thus saving energy to a great extent and reducing heat loss and environmental pollution of emission, energy of the sintering zone and the cooling zone is not fully utilized, and a heat efficiency, a waste heat recovery rate and a carbon dioxide emission of the ceramic kiln all need to be further improved. In addition, the ceramic kiln is not equipped with an intelligent control system.

In addition, relatively simple automatic interlocking control of fuel burners and the temperature of the kiln chamber is used in existing ceramic kilns, which means that, when the temperature of the kiln chamber reaches a specified value, the fuel gas in burners are shut down, but combustion-supporting air is not stopped, which will lead to the defects of excessively high power consumption of fan and increased energy consumption.

SUMMARY OF PRESENT INVENTION

The present invention aims to provide an energy-saving low-carbon combustion system for a ceramic roller kiln aiming at the defects in the prior art above.

In order to achieve the objective above, the technical solution used in the present invention to solve the technical problems above is: an energy-saving low-carbon combustion system for a ceramic roller kiln, which comprises: a kiln body, a roller conveyor belt 2, a circulating fan 6 and a heat exchanger 3, wherein a retaining wall 4 is mounted in the kiln body, and a kiln chamber is divided into three sections: a low-temperature section 81, a medium-temperature section 82 and a high-temperature section 83 through the retaining wall 4; a flue gas exhaust port of the low-temperature section 81 is provided with the heat exchanger 3, an air pipe is connected with an air inlet of the heat exchanger 3, an air outlet of the heat exchanger 3 is connected with a hot air pipe 5 through a conveying pipe, and the hot air pipe 5 is connected with burners 9 in the medium-temperature section 82 and the high-temperature section 83 through branch pipes; the medium-temperature section 82 is provided with a heat introduction port which is connected with the circulating fan 6, and the circulating fan 6 is connected with the kiln chamber in the low-temperature section 81 through the conveying pipe, and flue gas at a temperature of 500° C. in a lower portion of the medium-temperature section 82 is partially introduced into the low-temperature section 81; and the roller conveyor belt 2 penetrates through the kiln body, and a ceramic tile blank 1 sequentially passes through the low-temperature section 81, the medium-temperature section 82 and the high-temperature section 83 in the kiln body on the roller conveyor belt 2 to be heated and sintered.

Preferably, the energy-saving low-carbon combustion system for the ceramic roller kiln further comprises an ammonia tank 13, wherein the ammonia tank 13 is connected with the hot air pipe 5. A small amount of ammonia ($NH_3$), which accounts for 15% to 25% of a flow volume of natural gas, is input into the hot air pipe 5, mixed with hot air and then burned with the natural gas, and since $NH_3$ does not contain carbon element, a carbon dioxide emission volume of the kiln can be effectively reduced.

The retaining wall 4 is installed in an upper inner wall and a lower inner wall in the kiln body, and is provided with a through-hole for the roller conveyor belt 2 to penetrate through.

Preferably, the medium-temperature section 82 is provided with a ceramic honeycomb body 7.

Preferably, an upper portion of the medium-temperature section 82 is provided with a flue gas drainage channel formed by the retaining wall 4 and the upper inner wall in the kiln body, a plurality of ventilation holes are arranged in a lower portion of the flue gas drainage channel, a plurality of ceramic honeycomb bodies 7 are mounted below the ventilation holes in the retaining wall at the lower portion of the flue gas drainage channel, and the ceramic honeycomb body 7 is located above the ceramic tile blank 1, and is closer to the ceramic tile 1.

The retaining wall 4 consists of a vertical part connected with an inner side wall of the kiln body and a horizontal part connected with an upper end portion of the vertical part, two sides of the horizontal part are connected with the side wall of the kiln body, the other end portion of the vertical part is connected with the retaining wall 4 installed between the low-temperature section 81 and the medium-temperature section 82, and the horizontal part and an upper wall of the kiln body form the flue gas drainage channel for draining the flue gas and mounting the ceramic honeycomb body 7.

Preferably, an online automatic weighing device 10 is arranged on the roller conveyor belt 2 outside an outlet of the roller kiln body, and is used for weighing the heated ceramic tile 1 accurately in real time.

The online weighing device 10 comprises a control display screen 14, a frame 12 and a workbench arranged on the frame 12, a weighing platform 31, a to-be-checked platform 21 and a detected platform 22 are arranged on the workbench, and the to-be-checked platform 21 and the detected platform 22 are respectively located on two sides of the weighing platform 31, wherein the to-be-detected platform 21 is located on a feeding side of the weighing platform 31, and the detected platform 22 is located on a discharging side of the weighing platform 31. The weighing platform 31 consists of two weighing units connected in series; and a weighing sensor is arranged in the weighing unit and is connected with a data processing unit arranged in the frame 12, the data processing unit is connected with a signal transmission module 11 mounted on the frame, and the signal transmission module 11 is wirelessly connected with the control display screen 14, so that weighing data may be remotely checked online in real time.

A natural gas pipeline, a hot air pipeline and an ammonia pipeline are all provided with an electric regulating valve.

A negative pressure sensor is arranged in the high-temperature section 83, and the negative pressure sensor and the circulating fan 6 are respectively connected with a control unit. The automatic interlocking control is performed by the control unit according to the corresponding parameters. For example, when a natural gas consumption volume per unit area of ceramic tile is higher than an ideal value, a frequency of the circulating fan is increased correspondingly, so that more flue gas heat is adsorbed by the ceramic tile and the consumption of the natural gas of unit area of ceramic tile is reduced; and when the natural gas consumption volume per unit area of ceramic tile is lower than the ideal value, the frequency of the circulating fan is reduced correspondingly, so as to avoid excessively high negative pressure of the ceramic kiln and excessively high power consumption of the fan, thus increasing energy consumption.

A secondary radiation heating device and an online heat efficiency detection device for the ceramic kiln are added in the present application, and a part of ammonia gas mixed with the natural gas is used for mixed combustion. In this way, an operating cost and a carbon dioxide emission volume of the ceramic roller kiln can be effectively reduced. Based on the technical solution above, an online heat efficiency display function and an automatic interlocking control function of the negative pressure of the kiln chamber and a recirculating fan of the flue gas are also added in the present application. A negative pressure sensor is arranged in the high-temperature section of the ceramic kiln, and meanwhile, an online display system for the natural gas consumption volume (heat efficiency) per unit area of ceramic tile is installed. An ideal natural gas consumption volume per unit area of ceramic tile is set first, and then a frequency of the recirculating fan of the flue gas is changed through feedback control, so as to keep the natural gas consumption volume (heat efficiency) per unit area of ceramic tile constantly close to the ideal value.

Compared with the prior art, the present invention has the beneficial effects that: a forced waste heat recovery mode for exhausted flue gas is adopted; meanwhile, the retaining wall is installed in the ceramic roller kiln, the heat exchange between the flue gas and the ceramic tile through gas scouring is changed from longitudinal gas scouring heat exchange to transverse gas scouring heat exchange through the retaining wall, which obviously enhanced heat exchange effect; a gas scouring speed is also significantly increased under the action of the circulating fan, a heat transfer coefficient between the flue gas and the ceramic tile is increased, the flue gas flows without dead zone, and a waste heat absorption rate of the flue gas is increased; the ceramic honeycomb body fully absorbs heat of high-temperature flue gas, and a temperature of the ceramic honeycomb body itself is sharply increased to 850° C., which can not only completely combust residual carbon particles in the flue gas, but also form secondary radiation heating for the ceramic tile in the medium-temperature section, thus improving a heat efficiency of the ceramic roller kiln while increasing a heat absorption capacity of the ceramic tile; the flue gas in the medium-temperature section is subjected to transverse scouring heat exchange with the ceramic tile, with a heat exchange intensity much higher than that of original longitudinal scouring, and meanwhile, the high-temperature ceramic honeycomb body is also used for performing secondary radiation heating on the ceramic tile, so that only a small number of natural gas burners need to be operated in the medium-temperature section to meet a heating requirement, thus saving a lot of fuel; and moreover, interlocking control of natural gas and combustion-supporting hot air is used in the art, the single natural gas burner pipeline and the corresponding hot air branch pipe are both provided with the electric regulating valve, and after the natural gas burner stops combusting, the electric regulating valve on the corresponding hot air branch pipe is also shut down accordingly, so that a widespread phenomenon for traditional ceramic roller kiln that a large amount of low-temperature combustion-supporting air is continuously blown into the ceramic kiln after the natural gas burner is shut down to cause increased energy consumption is completely eliminated, and a kiln temperature may be kept for a long time, thus further reducing a fuel consumption volume.

DETAILED DESCRIPTION OF PREFERRED EMBODIMENTS

Figure 1:
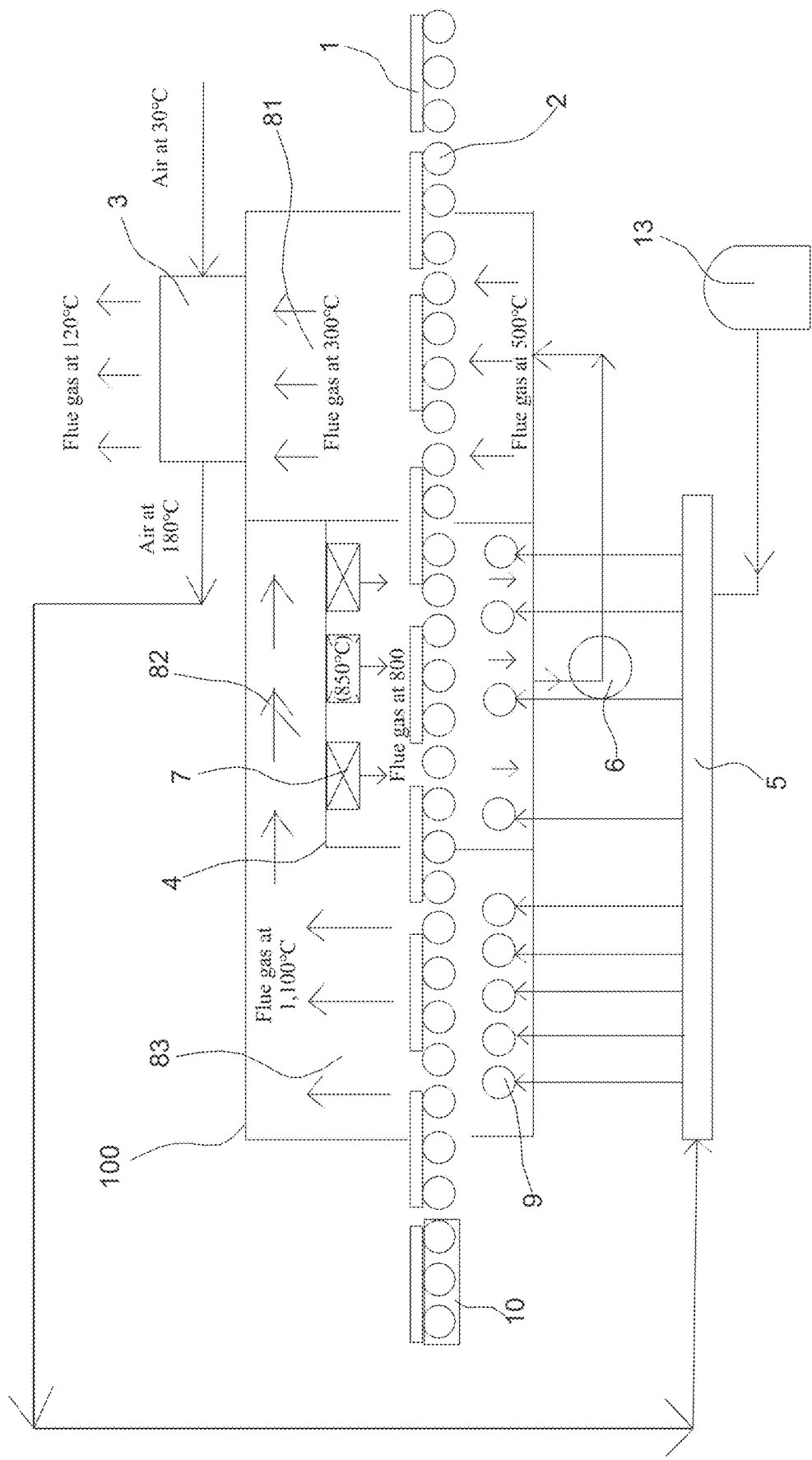
FIG. 1 is a schematic construction diagram of an energy-saving low-carbon combustion system for a ceramic roller kiln according to the present invention.

The present invention is described in detail hereinafter with reference to the drawings and the specific embodiments. Specific structures of the preferred embodiments of the present invention are shown in the drawings. For structural features of elements, if directions (up, down, left, right, front and back) are described, the description refers to the illustrated structures, but actual application directions of the present invention are not limited to this.

An energy-saving low-carbon combustion system for a ceramic roller kiln, as shown in FIG. 1, comprises a kiln body 100, a roller conveyor belt 2, a circulating fan 6 and a heat exchanger 3. A retaining wall 4 is mounted in the kiln body, and a kiln chamber is divided into three sections: a low-temperature section 81, a medium-temperature section 82 and a high-temperature section 83 through the retaining wall 4. A flue gas exhaust outlet of the low-temperature section 81 is provided with the heat exchanger 3, an air pipe is connected with an air inlet of the heat exchanger 3, an air outlet of the heat exchanger 3 is connected with a hot air pipe 5 through a conveying pipe, and the hot air pipe 5 is connected with burners 9 in the medium-temperature section 82 and the high-temperature section 83 through a branch pipe. Air at 30° C. is heated by flue gas exhausted from the low-temperature section 81 through the heat exchanger 3 to form hot air at 180° C. and the hot air is input into the hot air pipe 5, and then the hot air in the hot air pipe 5 is distributed to each burner 9 through the branch pipe for supporting combustion. In addition, the present application further comprises an ammonia tank 13, wherein the ammonia tank 13 is connected and communicated with the hot air pipe 5. A small amount of ammonia ($NH_3$), which accounts for 15% to 25% of a flow volume of natural gas, is input into the hot air pipe 5, mixed with the hot air and then burned with the natural gas, and since $NH_3$ does not contain a C element, carbon dioxide emission of the kiln can be effectively reduced. The medium-temperature section 82 is provided with a heat introduction outlet which is connected with the circulating fan 6, and the circulating fan 6 is connected with the kiln chamber in the low-temperature section 81 through the conveying pipe, and flue gas at 500° C. at a lower portion in the medium-temperature section 82 is partially introduced into the low-temperature section 81, so that waste heat of a part of flue gas can be effectively recycled, and meanwhile a direction of heat transferred through flue gas scouring in the medium-temperature section 82 is changed (from a longitudinal direction to a transverse direction) to improve a heating efficiency. The roller conveyor belt 2 penetrates through the kiln body, and a ceramic tile 1 sequentially passes through the low-temperature section 81, the medium-temperature section 82 and the high-temperature section 83 in the kiln body on the roller conveyor belt 2 to be heated and sintered. The retaining wall 4 is mounted in an upper inner wall and a lower inner wall in the kiln body, and is provided with a through hole for the roller conveyor belt 2 to penetrate through. The heat exchange between the flue gas and the ceramic tile 1 through gas scouring is changed from longitudinal gas scouring heat exchange to transverse gas scouring heat exchange through the retaining wall 4, a gas scouring speed is also significantly increased under the action of the flue gas passing through the circulating fan 6, a heat transfer coefficient between the flue gas and the ceramic tile 1 is increased, the flue gas flows without dead zone, and a waste heat absorption rate of the flue gas is greatly increased The medium-temperature section 82 is provided with a ceramic honeycomb body 7. The ceramic honeycomb body 7 realizes secondary radiation heating of the ceramic tile after absorbing heat, which can effectively maintain a temperature in the medium-temperature section 82 and the heat exchange efficiency between the flue gas and the ceramic tile 1. Preferably, an upper portion of the medium-temperature section 82 is provided with a flue gas drainage channel formed by the retaining wall 4 and the upper inner wall in the kiln body, a plurality of ventilation holes are arranged in a lower portion of the flue gas drainage channel, a plurality of ceramic honeycomb bodies 7 are mounted below the ventilation holes in the lower portion of the flue gas drainage channel, and the ceramic honeycomb body 7 is located above the ceramic tile 1, and is closer to the ceramic tile 1. Preferably, in the medium-temperature section 82, the retaining wall 4 consists of a vertical part connected with an inner side wall of the kiln body and a horizontal part connected with an upper end portion of the vertical part, two sides of the horizontal part are connected with the side wall of the kiln body, the other end portion of the vertical part is connected with the retaining wall 4 between the low-temperature section 81 and the medium-temperature section 82, and the horizontal part and an upper wall of the kiln body form the flue gas drainage channel for draining the flue gas and mounting the ceramic honeycomb body 7.

Figure 2:
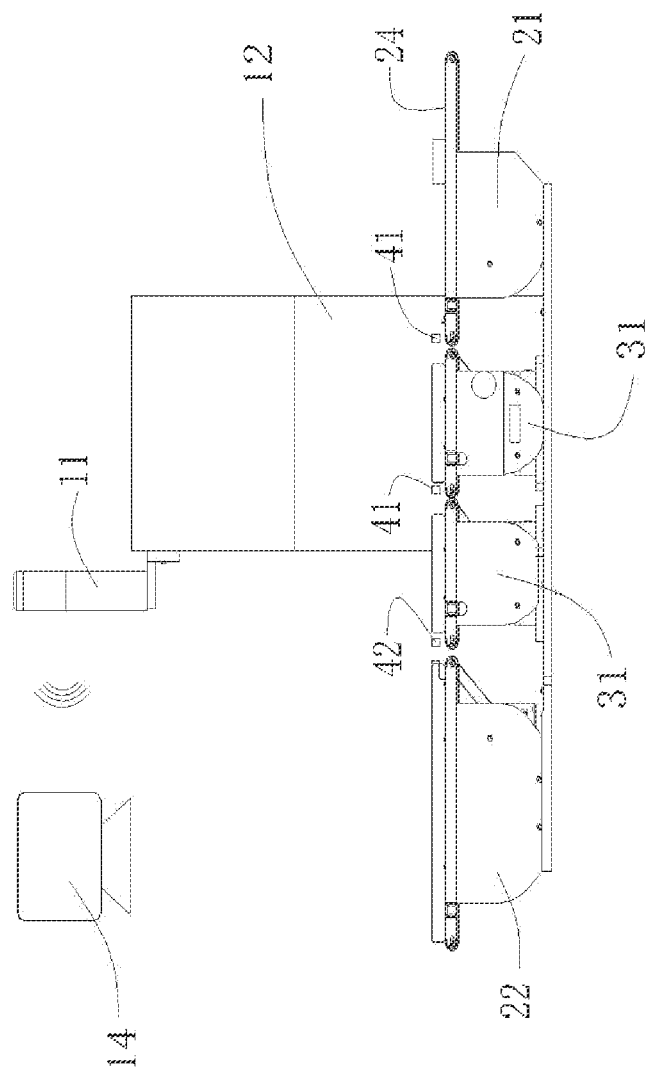
FIG. 2 is a structural diagram of an online weighing device.

An online weighing device 10 is arranged on the roller conveyor belt 2 outside an outlet of the kiln body, and is used for weighing the heated ceramic tile 1 accurately in real time. The online weighing device 10, as shown in FIG. 2, comprises a control display screen 14, a frame 12 and a workbench arranged on the frame 12, a weighing platform 31, a to-be-detected platform 21 and a detected platform 22 are arranged on the workbench, and the to-be-checked platform 21 and the detected platform 22 are respectively located on two sides of the weighing platform 31, wherein the to-be-checked platform 21 is located on a feeding side of the weighing platform 31, and the detected platform 22 is located on a discharging side of the weighing platform 31. The weighing platform 31 consists of two weighing units connected in series. A weighing sensor is arranged in the weighing unit and is connected with a data processing unit arranged in the frame 12, the data processing unit is connected with a signal transmission module 11 mounted on the frame, and the signal transmission module 11 is wirelessly connected with the control display screen 14, so that weighing data may be remotely checked online in real time. The signal transmission module 11 may be a wireless transmitter. The to-be-checked platform 21 and the detected platform 22 are provided with a first conveyor belt 24 which is connected with the roller conveyor belt 2, and a first motor connected with and driving the first conveyor belt 24 is mounted on the frame 12. Each weighing unit respectively comprises a weighing base, the weighing sensor, a second conveyor belt and a second motor. The second motor is connected with and drives the second conveyor belt to convey towards the detected platform 22, the weighing sensor is mounted in a weighing frame, the weighing frame is mounted on the weighing base, an object to be detected on the second conveyor belt is weighed by the weighing frame, and corresponding weighing data is transmitted to the data processing unit for processing through the weighing sensor. A vibration isolation pad is arranged between the weighing units to separate the weighing units from each other, so as to prevent various modal resonances generated by a mechanical structure, thus ensuring that data bits of each weighing unit are independently and identically distributed. A feeding end of the weighing unit is provided with a first photoelectric detection device 41, so as to judge whether the object to be detected enters the weighing unit and count the objects to be detected. A discharging end of the weighing unit is provided with a second photoelectric detection device 42, so as to judge whether the weighing is finished. The first photoelectric detection device 41 and the second photoelectric detection device 42 are respectively connected with the data processing unit 14. Preferably, the photoelectric detection device 41 is mounted at the same position of two weighing units, and is used for detecting trigger data of weighing as a start signal and an end signal of each weighing platform. Preferably, weighing surfaces of the two weighing units are in the same horizontal position, which can effectively improve an accuracy. The same motor, the same belt, the same motor-driven synchronous belt and the same resistance strain sensor are used in the weighing units connected in series, with the same mechanical structure, which are jointly fixed on one weighing bracket. The detected platform 22 is connected with the roller conveyor belt 2 to convey the weighed ceramic tile 1.

In the present invention, a forced waste heat recovery mode for exhausted flue gas is used, the circulating fan 6 is mounted outside the kiln body, and meanwhile, the retaining wall 4 is mounted in the kiln body, so that the kiln body of the ceramic roller kiln is divided into three sections: the low-temperature section 81, the medium-temperature section 82 and the high-temperature section 83 through the retaining wall 4. Under a suction action of the circulating fan 6, the heat exchange between the flue gas and the ceramic tile through gas scouring is changed from longitudinal gas scouring heat exchange to transverse gas scouring heat exchange, a flue gas scouring speed is also significantly increased under the action of the circulating fan 6, a heat exchange intensity between the flue gas and the ceramic tile is increased, the flue gas flows without dead zone, and a waste heat absorption rate of the flue gas is increased. The ceramic honeycomb body 7 is mounted in the medium-temperature section 82 to realize secondary radiation heating of the ceramic tile. For the flue gas under the suction action of the circulating fan 6, high-temperature flue gas at a temperature up to 1,100° C. in the high-temperature section 83 passes through the ceramic honeycomb body 7 at a low speed, and then the temperature of the flue gas is reduced to 800° C. after heat release. The ceramic honeycomb body 7 fully absorbs heat of the high-temperature flue gas, and a temperature of the ceramic honeycomb body itself is sharply increased to 850° C., so that secondary radiation heating is formed for the ceramic tile in the medium-temperature section 82, thus improving a heat efficiency of the ceramic kiln while increasing a heat absorption capacity of the ceramic tile. The flue gas in the medium-temperature section 82 is subjected to transverse scouring heat exchange with the ceramic tile, with a heat exchange intensity much higher than that of original longitudinal scouring mode, after the flue gas at 800° C. releases heat to the ceramic tile, the temperature is reduced to 500° C. and then the flue gas enters the low-temperature section 81, and meanwhile, the high-temperature ceramic honeycomb body 7 is also used for performing secondary radiation heating on the ceramic tile, so that only a small number of natural gas burners 9 need to be operated in the medium-temperature section 82 to meet a heating requirement, thus saving a lot of fuel. The outlet of the ceramic kiln is provided with the online weighing device 10 with an automatic weighing function, and a surface area of the ceramic tile may be calculated according to a weight, a thickness and a density of the ceramic tile. Specifically, the ceramic tile is made of a fixed material, with a known density and a known thickness, both of which are determined when the ceramic tile 1 is produced. The online weighing device 10 may accurately give a weight of the ceramic tile, and then the weight of the ceramic tile is divided by the density and thickness of the ceramic tile to obtain the area of the ceramic tile, which may be displayed online through a display module. Meanwhile, a natural gas flowmeter is mounted on a natural gas main pipe, a flow rate of the natural gas is measured through the flowmeter, and a measured result is displayed online on the display module.

The flow volume of the natural gas is divided by the area of the ceramic tile to obtain a natural gas consumption volume per unit area of ceramic tile, which is namely another expression mode of the heat efficiency of the ceramic kiln, and a result is displayed online on the display module to realize online display of the heat efficiency of the ceramic kiln, which may reflect the heat efficiency of the ceramic kiln. Whether the kiln needs to be maintained may be determined accurately according to a detection value of the heat efficiency of the ceramic kiln.

A negative pressure sensor is arranged in the high-temperature section 83, and the negative pressure sensor and the circulating fan 6 are respectively connected with a control unit. The automatic interlocking control is performed by the control unit according to the corresponding parameters. A negative pressure value of the high-temperature section 83 is set between −20 Pa and −30 Pa. If a negative pressure in the high-temperature section 83 is lower than a limited value (such as −40 Pa), a frequency of the circulating fan 6 is reduced, so that a negative pressure in the kiln chamber is reduced; and on the contrary, if the negative pressure in the high-temperature section is lower than the limited value (such as −10 Pa), the frequency of the circulating fan 6 is increased, so that the negative pressure in the kiln chamber is increased.

Since semi-automatic interlocking control of a fuel burner 9 and a temperature of the kiln chamber is used in an ordinary ceramic roller kiln at present, which means that, when the temperature of the kiln chamber reaches a specified value, the fuel burner is shut down, but combustion-supporting air is not stopped. In the present application, the online display of the heat efficiency and an automatic interlocking control function of the negative pressure in the kiln chamber and a recirculating fan are also added on this basis. An ideal natural gas consumption volume per unit area of ceramic tile is set, and then a frequency of the recirculating fan is changed through feedback control, so as to keep the natural gas consumption volume (heat efficiency) per unit area of ceramic tile constantly close to the ideal value. For example, when the natural gas consumption volume per unit area of ceramic tile is higher than the ideal value, the frequency of the recirculating fan of the flue gas is increased correspondingly, so that more flue gas heat is adsorbed by the ceramic tile and unit consumption is reduced; and when the natural gas consumption volume per unit area of ceramic tile is lower than the ideal value, the frequency of the recirculating fan of the flue gas is reduced correspondingly, so as to avoid excessively high negative pressure of the ceramic kiln and excessively high power consumption of the fan, thus increasing energy consumption.

A hot air combustion-supporting mode is used, an outlet section of the low-temperature section 81 of the ceramic kiln is provided with the heat exchanger 3 to absorb the waste heat of the flue gas exhausted from the ceramic kiln so as to generate hot air for supporting combustion of the natural gas burner 9. A temperature of the flue gas is reduced from 300° C. to 120° C. after heat exchange, cold air at 30° C. becomes hot air at 180° C. after absorbing heat, and then the hot air enters the natural gas burner 9 for supporting combustion through a pipeline, thus achieving a remarkable energy-saving effect. A single natural gas pipeline and a corresponding hot air branch pipe are both provided with an electric regulating valve, which can realize that when the temperature of the kiln chamber reaches the specified value, the natural gas burner 9 is shut down, and the corresponding hot air branch pipe is also shut down, so that a widespread phenomenon that a large amount of low-temperature combustion-supporting air is continuously blown into the ceramic kiln after the natural gas burner is shut down to cause increased energy consumption is completely eliminated, and a kiln temperature may be kept for a long time, thus further reducing a fuel consumption volume.

Records of ceramic tile production and energy consumption in one specific embodiment of the energy-saving low-carbon combustion system for the ceramic roller kiln of the present application are as follows, and shown in the following table:

| Type of ceramic tile: 800 × 800 mm (Crystallized Glass Panel) | | | | | | |
|---|---|---|---|---|---|---|
| Before transformation (2020) | | | After transformation (2021) | | | |
| November | Natural Gas consumption volume m³ | Output m² | Energy consumption per unit of product m³/m² | December | Gas consumption volume m³ | Output m² | Energy consumption per unit of product m³/m² |
| 10th day | 15304 | 4664.32 | 3.28 | 13th day | 14024 | 5227.52 | 2.68 |
| 11th day | 15387 | 4810.24 | 3.2 | 14th day | 13942 | 5322.88 | 2.62 |
| 12th day | 15282 | 5006.08 | 3.05 | 17th day | 19566 | 5317.12 | 2.63 |
| 13th day | 103747 | 4939.52 | 3.00 | 18th day | 13846 | 5349.12 | 2.57 |
| 14th day | 14821 | 5112.32 | 2.86 | | | | |
| 15th day | 14841 | 5256.96 | 2.82 | | | | |
| 16th day | 14376 | 5240.96 | 2.74 | | | | |
| 17th day | 13799 | 5205.76 | 2.65 | | | | |
| Average | | | 2.95 | Average | | | 2.625 |

According to data in the above table, an average energy saving rate of the present application may be calculated: (2.95−2.625)/2.95×100%=11%.

The above are only the preferred embodiments of the present invention, and are not intended to limit the implementation scope of the present invention, which means that all simple equivalent changes and modifications made according to the scope of the patent for application of the present invention and the contents of the description of the present invention should all belong to the scope of the patent of the present invention.

We claim:

1. A system, comprising:
a kiln body having a kiln chamber, a roller conveyor belt, a circulating fan and a heat exchanger, wherein a first retaining wall and a second retaining wall are mounted in the kiln body, and the kiln chamber is divided into three sections: a low-temperature section, a medium-temperature section and a high-temperature section by the first retaining wall and the second retaining wall; a flue gas exhaust outlet of the low-temperature section is provided with the heat exchanger, an air pipe is connected with an air inlet of the heat exchanger, an air outlet of the heat exchanger is connected with a hot air pipe through a conveying pipe, and the hot air pipe is connected with burners in the medium-temperature section and the high-temperature section through branch pipes; the medium-temperature section is provided with a heat introduction outlet which is connected with the circulating fan, and the circulating fan is connected with the kiln chamber in the low-temperature section through the conveying pipe, and flue gas in the medium-temperature section is partially introduced into the low-temperature section; and the roller conveyor belt penetrates through the kiln body, wherein the system is configured to allow a ceramic tile to sequentially pass through the low-temperature section, the medium-temperature section and the high-temperature section in the kiln body on the roller conveyor belt to be heated and sintered.

2. The system according to claim 1, further comprising an ammonia tank, wherein the ammonia tank is connected and communicated with the hot air pipe.

3. The system according to claim 2, wherein the medium-temperature section is provided with a plurality of ceramic honeycomb bodies.

4. The system according to claim 3, wherein an upper portion of the medium-temperature section is provided with a flue gas drainage channel formed by the first retaining wall, a plurality of ventilation holes are arranged in the first retaining wall at a lower portion of the flue gas drainage channel, the plurality of ceramic honeycomb bodies are mounted below the plurality of ventilation holes in the first retaining wall at the lower portion of the flue gas drainage channel, and the ceramic honeycomb bodies are located above the ceramic tile.

5. The system according to claim 4, wherein the first retaining wall consists of a vertical part connected with an inner side wall of the kiln body and a horizontal part, one end of the horizontal part is connected with an upper end portion of the first vertical part, two sides of the horizontal part are connected with side walls of the kiln body, another end of the horizontal part is connected with the second retaining wall installed between the low-temperature section and the medium-temperature section, and the horizontal part and the side walls of the kiln body form the flue gas drainage channel for draining the flue gas and mounting the ceramic honeycomb bodies.

6. The system according to claim 5, wherein an online weighing device is arranged on the roller conveyor belt outside an outlet of the kiln body, and is used for weighing the heated ceramic tile accurately in real time.

7. The system according to claim 6, wherein the online weighing device comprises a control display screen, a frame and a workbench arranged on the frame; a weighing platform, a to-be-checked platform and a detected platform are arranged on the workbench, and the to-be-checked platform and the detected platform are respectively located on two sides of the weighing platform, wherein the to-be-checked platform is located on a feeding side of the weighing platform, and the detected platform is located on a discharging side of the weighing platform.

8. The system according to claim 7, wherein the weighing platform consists of two weighing units connected in series; and a weighing sensor is arranged in the weighing unit and is connected with a data processing unit arranged in the frame, the data processing unit is connected with a signal transmission module mounted on the frame, and the signal transmission module is wirelessly connected with the control display screen.

9. The system according to claim 1, wherein a negative pressure sensor is arranged in the high-temperature section, and the negative pressure sensor and the circulating fan are respectively connected with a control unit.

* * * * *